US011645767B2

(12) United States Patent
Kaethner et al.

(10) Patent No.: US 11,645,767 B2
(45) Date of Patent: May 9, 2023

(54) CAPTURING A MISALIGNMENT

(71) Applicant: Siemens Healthcare GmbH, Erlangen (DE)

(72) Inventors: Christian Kaethner, Forchheim (DE); Boris Stowasser, Erlangen (DE)

(73) Assignee: Siemens Healthcare GmbH, Erlangen (DE)

(\*) Notice: Subject to any disclaimer, the term of this patent is extended or adjusted under 35 U.S.C. 154(b) by 57 days.

(21) Appl. No.: 17/094,996

(22) Filed: Nov. 11, 2020

(65) Prior Publication Data

US 2021/0150739 A1 May 20, 2021

(30) Foreign Application Priority Data

Nov. 14, 2019 (DE) ...................... 10 2019 217 576.7

(51) Int. Cl.
*G06K 9/00* (2022.01)
*G06T 7/30* (2017.01)

(52) U.S. Cl.
CPC ...... *G06T 7/30* (2017.01); *G06T 2207/10116* (2013.01)

(58) Field of Classification Search
CPC ............. G06T 7/30; G06T 2207/10116; G06T 3/0068
See application file for complete search history.

(56) References Cited

U.S. PATENT DOCUMENTS

| 2017/0103540 | A1* | 4/2017 | Brokman | ............ | A61B 6/5247 |
| 2017/0169579 | A1* | 6/2017 | Endo | ........................ | G06T 7/30 |
| 2019/0139208 | A1* | 5/2019 | Chen | .................. | G06V 10/7515 |

FOREIGN PATENT DOCUMENTS

| CN | 109993709 | A | * | 7/2019 | ............. | G06T 5/001 |
| JP | 4638042 | B2 | * | 2/2011 | ........... | G06T 3/0068 |

OTHER PUBLICATIONS

German Office Action for German Application No. 10 2019 217 576.7 dated Oct. 16, 2020.
Liu, Jun, et al. "Image Registration in Medical Robotics and Intelligent Systems: Fundamentals and Applications." Advanced Intelligent Systems 1.6 (2019): 1900048. pp. 1-16.
Lucas, Bruce D., and Takeo Kanade. "An iterative image registration technique with an application to stereo vision." (1981): 121-130.
Maier, Andreas, et al. "A gentle introduction to deep learning in medical image processing." Zeitschrift fur Medizinische Physik 29.2(2019): 86-101.
Ulysses, J. N., and A. Conci. "Measuring similarity in medical registration." IWSSIP 17th Int. Conf, on Systems, Signals and Image Processing. 2010. pp. 1-4.

\* cited by examiner

*Primary Examiner* — Atiba O Fitzpatrick
(74) *Attorney, Agent, or Firm* — Lempia Summerfield Katz LLC

(57) ABSTRACT

Systems and method for providing misaligned image features. A method includes receiving a first and a second image data set, wherein the first and the second image data sets map at least partially a shared examination region of an examination object, registering the first image data set with the second image data set, determining a distance data set based on the registered first image data set and the second image data set, identifying the misaligned image features in the distance data set that are caused by a misalignment between the registered first and the second image data sets, and providing the identified misaligned image features.

16 Claims, 7 Drawing Sheets

CAPTURING A MISALIGNMENT

CROSS REFERENCE TO RELATED APPLICATIONS

This patent document also claims the benefit of DE 102019217576.7 filed on Nov. 14, 2019 which is hereby incorporated in its entirety by reference.

FIELD

Embodiments relate to a computer-implemented method for capturing misaligned image features.

BACKGROUND

X-ray based imaging methods are often used for capturing changes over time at an examination region of an examination object, for example a human and/or an animal patient. In this connection the change over time at the examination region of the examination object may include, for example, a spreading movement and/or flowing movement of a contrast medium in a vessel system and/or a movement of a medical object, for example a medical instrument, for example a catheter and/or guide wire, and/or a diagnostic instrument, for example an endoscope. The X-ray based imaging methods frequently include digital subtraction angiography (DSA) where at least two chronologically recorded X-ray images, that map at least partially the shared examination region, are subtracted from each other. A differential image is frequently provided as a result of the DSA. The components in the differential image that are irrelevant and/or disruptive to a treatment and/or diagnosis, and for example do not change over time, may frequently be reduced and/or removed hereby.

From the prior art it is also known that before the subtraction of the at least two X-ray images, registering between the at least two X-ray images relative to each other occurs. While movement artifacts and/or altered recording parameters, for example an altered recording geometry, may be at least partially compensated hereby, it is disadvantageous, however, that in the case of inadequate registering between the at least two X-ray images, image artifacts may frequently occur in the differential image, that remain unknown and/or may be misinterpreted for a diagnosis and/or treatment.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments analyze the reliability of registering of medical images in such a way that subsequent medical image interpretation is supported.

Embodiments are described below in relation to both methods and apparatuses for providing misaligned image features and in relation to methods and apparatuses for providing trained functions. Features, advantages, and alternative embodiments of data structures and/or functions in the case of methods and apparatuses for providing misaligned image features may be transferred here to analogous data structures and/or functions in methods and apparatuses for providing trained functions. Analogous data structures may be identified by the use of the prefix "training". The trained functions used in methods and apparatuses for providing misaligned image features may include been adjusted and/or provided for example by methods and apparatuses for providing trained functions.

Embodiments relate to a computer-implemented method for providing misaligned image features. A first and a second image data set are received. The first and second image data sets map at least partially a shared examination region of an examination object. The first image data set is registered with the second image data set. A distance data set is determined on the basis of the registered first image data set and the second image data set. The misaligned image features in the distance data set are identified, that are caused by a misalignment between the registered first and the second image data set. The identified misaligned image features are provided.

Receiving of the first and/or the second image data set may include, for example, acquisition and/or reading out from a computer-readable data memory and/or receiving from a data memory unit, for example a database. The first and/or the second image data set may be provided by a providing unit of a medical imaging device.

The first and/or second image data set may include, for example, two-dimensional and/or three-dimensional image data, including a plurality of image points, for example pixels and/or voxels. The first and second image data sets map at least partially a shared examination region of the examination object. In addition, the first and/or second image data set may map a course over time, for example a phase of the course over time, of a change at the examination region of the examination object. The phase of the course over time of the change at the examination region of the examination object may be based, for example, on a physiological parameter of the examination object, for example a respiratory state and/or a cardiac state, and/or a phase of a spreading movement and/or flowing movement of a contrast medium in a vessel system of the examination object and/or a phase of a movement of a medical object arranged in the examination region.

With digital subtraction angiography (DSA), for example the first image data set may map a mask phase, while the second image data set may map a full phase. The first image data set and/or the second image data set may include, for example, in each case at least one projection X-ray image of the examination region of the examination object. For example, the first and/or second image data set may include a two-dimensional and/or three-dimensional scene.

The first and second image data sets may be recorded by a medical imaging device. The medical imaging device may be configured as an X-ray device and/or a C-arm X-ray device and/or magnetic resonance system (MRT) and/or computed tomography system (CT) and/or sonography system and/or positron emission tomography system (PET).

The first and/or second image data set may include metadata. The metadata may include information on recording parameters and/or operating parameters of the medical imaging device for recording of the first and/or of the second image data set.

When registering the first image data set with the second image data set, the first image data set may be rigidly and/or non-rigidly transformed according to a transformation rule. The first image data set may be registered in relation to the second image data set according to the transformation rule. The second image data set may be registered in relation to the first image data set according to the transformation rule. Registering may take place in such a way that the section, mapped in the first and in the second image data sets, of the at least partially shared examination region is optimally correlated. Registering of the first image data set with the second image data set may also take place on the basis of the metadata of the first and/or of the second image data set. For example, registering may include providing a registered first image data set.

The distance data set may be determined on the basis of the registered first image data set and the second image data set provided. The distance data set may include information relating to a difference and/or a distance between at least one first region-of-interest (ROI), including a plurality of image points of the registered first image data set, and a second region-of-interest corresponding therewith, including a plurality of image points of the second image data set. The distance data set may also include information, for example two-dimensional and/or three-dimensional information, relating to a registering error between the at least one first region-of-interest and the second region-of-interest corresponding therewith. Determination of the distance data set may include a difference and/or a scalar product and/or a comparison between the registered first image data set and the second image data set. The distance data set may be determined in a standardized manner and/or be standardized.

The distance data set may exhibit all differences between the registered first image data set and the second image data set.

The misaligned image features, that are caused by a misalignment between the registered first and the second image data sets, in the distance data set are identified. The identification of the misaligned image features may also include a classification of image features in the distance data set. For example, artifacts from registering may be identified as misaligned image features in the distance data set. Identifying the misaligned image features in the distance data set may include a localization and/or marking, for example an annotation, of the misaligned image features in the distance data set. All differences between the registered first image data set and the second image data set, that are present in the distance data set and are not caused by a misalignment, may be identified as a change at the examination region of the examination object, moreover. For this, for example a blood flow simulation, for example a two-dimensional and/or three-dimensional one, for modeling a contrast medium spread in the examination region of the examination object may be used. The misaligned image features in the distance data set may include, for example, geometric image features and/or high-contrast objects, for example edges.

Providing the identified misaligned image features may include, for example, storage on a computer-readable storage medium and/or display on a representation unit and/or transfer to a providing unit. In this connection, for example a graphic, for example color-coded, depiction of the identified misaligned image features in the distance data set may facilitate an evaluation of the result of registering. Intuitive capturing of the misaligned image features identified in the distance data set, for example by an operator, may be facilitated by observation of the graphic depiction. The graphic depiction of the misaligned image features may include a superimposition, for example a weighted superimposition, with the registered first image data set and/or the second image data set.

According to an embodiment of the computer-implemented method for providing misaligned image features, at least one parameter of registering may be adjusted, for example iteratively, on the basis of the misaligned image features identified. A number and/or a characteristic of misaligned image features in the distance data set may be reduced by, for example iteratively, repeated execution of registering, determining, and identifying. The result of registering in may be improved hereby.

In an embodiment of the computer-implemented method for providing misaligned image features, the identification of misaligned image features may also be based on the first image data set, the second image data set and/or the registered first image data set.

For example, the identification of misaligned image features in the distance data set in may be based on a comparison of the distance data set with the first image data set, the second image data set and/or the registered image data set. For example, anatomical and/or geometric image features, that are present in the first image data set, the second image data set and/or the registered image data set, are compared with the misaligned image features identified in the distance data set. This may provide that no anatomical image features and/or changes at the examination region of the examination object, for example due to a spreading movement of a contrast medium, are identified as misaligned image features. Artifacts, that may be caused, for example, by a re-screening and/or re-scaling of the registered first image data set, may be identified as misaligned image features by consideration of the first image data set, moreover.

In an embodiment of the computer-implemented method for providing misaligned image features, the identification of the misaligned image features may take place by applying a trained function to input data. The input data may be based on the distance data set. At least one parameter of the trained function may be based on a comparison of training misaligned image features with comparison misaligned image features.

The trained function may be trained by a method of machine learning. For example, the trained function may be a neural network, for example a convolutional neural network (CNN) or a network including a convolutional layer.

The trained function maps input data on output data. The output data may also depend, for example, on one or more parameter(s) of the trained function. The one or more parameter(s) of the trained function may be determined and/or adjusted by training. Determination and/or adjustment of the one or more parameter(s) of the trained function may be based, for example, on a pair of training input data and associated training output data, with the trained function for generating training imaging data being applied to the training input data. For example, determination and/or adjustment may be based on a comparison of the training imaging data and the training output data. A trainable function, in other words, a function with one or more as yet unadjusted parameter(s), may also be referred to as a trained function.

Other terms for trained function are trained mapping rule, mapping rule with trained parameters, function with trained parameters, algorithm based on artificial intelligence, machine learning algorithm. One example of a trained function is an artificial neural network. The edge weights of the artificial neural network match the parameters of the trained function. Instead of the term "neural network", the term "neuronal network" may also be used. For example, a trained function may also be a deep neural network (deep artificial neural network). A further example of a trained function is a "Support Vector Machine". For example, other machine learning algorithms may also be used as a trained function.

The trained function may be trained, for example, by a back propagation. Training imaging data may be determined by applying the trained function to training input data. A difference between the training imaging data and the training output data may be determined by applying an error function to the training imaging data and the training output data accordingly. At least one parameter, for example a weighting, of the trained function, for example of the neural network, may be iteratively adjusted on the basis of a gradient of the error function in respect of the at least one parameter of the trained function. The difference between the training mapping data and the training output data during training of the trained function may be minimized hereby.

The trained function, for example the neural network, includes an input layer and an output layer. The input layer may be configured to receive input data. The output layer may be configured to provide mapping data. The input layer and/or the output layer may each include a plurality of channels, for example neurons.

At least one parameter of the trained function may be based on a comparison of training misaligned image features with comparison misaligned image features. The training misaligned image features and/or the comparison misaligned image features may be determined as part of a computer-implemented method for providing a trained function, that will be explained in the further course of the description. For example, the trained function may be provided by an embodiment of the computer-implemented method for providing a trained function.

This may provide a robust and reliable identification of the misaligned image features in the distance data set.

In an embodiment of the computer-implemented method for providing misaligned image features, the identification of the misaligned image features may take place by applying a trained function to input data. The input data may also be based on the first image data set, the second image data set and/or the registered first image data set.

This may provide that no anatomical image features and/or changes at the examination region of the examination object, for example due to a spreading movement of a contrast medium, are identified as misaligned image features. Artifacts, that may be caused, for example, by a re-screening and/or re-scaling of the registered first image data set, for example during registering, may be identified as misaligned image features by consideration of the first image data set.

In an embodiment of the computer-implemented method for providing misaligned image features, the distance data set may include a vector field and/or a tensor field and/or distance information between the registered first and the second image data set.

The vector field and/or may include a tensor field and/or the distance information may include a mapping rule between individual image points, for example those that correspond with each other, of the registered first and the second image data set. Image points and/or image regions of the distance data set, to which the vector field and/or the tensor field and/or the distance information allocates a slight difference between the registered first and the registered image data set, may be excluded in the identification of the misaligned image features. For example, a difference between individual image points and/or an image region of the registered first image data set and of the second image data set may be quantified by the vector field and/or the tensor field and/or the distance information. A change at the examination region of the examination object, for example a spreading movement of a contrast medium, may be determined as such by a mapping rule between image points of the registered first image data set and image points of the second image data set. This may provide that changes at the examination region of the examination object, that are mapped in the registered first and the second image data set, are not identified as misaligned image features in step d). For example, the vector field and/or the tensor field may quantitatively describe a spatial change in position of an anatomical image feature mapped in at least one image point of the registered first image data set and at least one further image point of the second image data set.

In an embodiment of the computer-implemented method for providing misaligned image features, the second image data set may be recorded before or after the first image data set. The second image data set may map a change over time at the examination region of the examination object compared to the first image data set.

The second image data set may map the at least partially shared examination region of the examination object at one instant and/or over a period before or after recording of the first image data set. For example, the first and the second image data set may be recorded chronologically. For example, the change at the examination region of the examination object may include a movement of a medical instrument, for example a catheter, and/or a spreading movement of a contrast medium, for example in a vessel system of the examination object.

The first image data set, for example, may map a condition of the examination region of the examination object before a change at the examination region. If the first image data set includes a scene, for example a two-dimensional and/or three-dimensional one, the examination region of the examination object may be dynamically mapped over a period. The second image data set, if it is recorded after the first image data set, may map the change at the examination region. If the second image data set includes a scene, for example a two-dimensional and/or three-dimensional one, the examination region of the examination object may be mapped dynamically over a period after recording of the first image data set. For example, all dynamically occurring changes and those that are repeated over time during recording of the first and of the second image data sets, for example physiological ones, at the examination region of the examination object, for example a blood flow and/or a respiratory movement, are considered hereby when determining the distance data set. For example, these changes at the examination region of the examination object, that are present in the first and the second image data sets, may be identified as not being misaligned image features.

Additional consideration of the first image data set, the second image data set and/or the registered first image data set may provide that changes at the examination region of the examination object, that are present in the first and the second image data sets, are not identified as misaligned image features.

In an embodiment of the computer-implemented method for providing misaligned image features, the first image data set may include first individual images of a first phase and the second image data set may include second individual images of a second phase of an image series of the examination region of the examination object. The first and the second phases may be determined using an acquisition parameter of the image series and/or a physiological parameter of the examination object.

The first and the second phases of the image series may include, for example, a temporal and/or physiological phase. The acquisition parameter of the image series may include, for example, an X-ray dose and/or an exposure time and/or a sensitivity value of an X-ray detector and/or a dose adjustment of a contrast medium injector and/or a flow rate of a contrast medium injector. The physiological parameter of the examination object may describe, for example, a heartrate and/or a cardiac state and/or a respiratory rate and/or a respiratory state of the examination object.

The first and the second phases may be determined using the acquisition parameter of the image series and/or the physiological parameter of the examination object in such a way that the individual images of the image series are each recorded with substantially the same acquisition parameters and/or physiological parameters within the first or the second phase. For example, all first individual images of the first phase of the image series may be recorded with substantially the same acquisition parameters and/or with substantially the same physiological parameters of the examination object. Analogously, all second individual images of the second phase of the image series may be recorded with substantially the same acquisition parameters and/or with substantially the same physiological parameters of the examination object. In the case of digital subtraction angiography (DSA), for example the first image data set may map a mask phase while the second image data set maps a full phase.

A high consistency between the first individual images of the first phase and a high consistency between the second individual images of the second phase of the image series may be provided. For example, improved multi-phase registering between the respective individual images of the image series is enabled.

In an embodiment of the computer-implemented method for providing misaligned image features, at least one of the first individual images may be registered with at least one of the second individual images. Registering may also include registering at least some of the first individual images with each other and/or registering at least some of the second individual images with each other. The distance data set may be determined on the basis of the registered at least one first individual image and the at least one second individual image. Determining may include determining a further distance data set based on the registered first individual images and/or the registered second individual images. In addition, identifying may also include identifying misaligned image features in the further distance data set, that are caused by a misalignment between the registered first individual images and/or between the registered second individual images.

For example, movement-induced changes at the examination region of the examination object within the respective phase of the image series may be reduced by registering at least some of the first individual images with each other and/or at least some of the second individual images with each other. The further distance data set may be determined on the basis of the registered, for example with each other, first individual images and/or the registered, for example with each other, second individual images. For example, the further distance data set may include a first and/or a second distance data set, with the first and/or the second distance data set each being based on the registered first and/or the registered second individual images. The first and/or the second distance data set may exhibit all differences between the registered first and/or the registered second individual images. The registered first and the registered second individual images within the respective phase of the image series include only slight differences, that may be caused by an acquisition parameter of the image series and/or a physiological parameter of the examination object. The further distance data set, for example the first and/or the second distance data set, may include substantially misaligned image features, that are caused by a misalignment, for example during registering of the respective individual images in relation to each other.

These misaligned image features may be identified in the further distance data set, for example analogously to the identification of the misaligned image features in the distance data set.

The first individual images registered with each other may also be registered with at least one of the second individual images, for example with the second individual images registered with each other, moreover. The distance data set may be determined on the basis of the registered at least one first individual image and the at least one second individual image. Both the misaligned image features in the distance data set, that are caused by a misalignment between the registered at least one first individual image and the at least one second individual image, as well as the misaligned image features in the further distance data set, that are caused by a misalignment between the first individual images of the first phase and/or between the second individual images of the second phase of the image series, may be identified hereby.

A graphic, for example color-coded, representation of the further distance data set, for example of the first and/or of the second distance data set, and/or the misaligned image features identified therein may be displayed on a representation unit. An evaluation of the results of registering is provided hereby. Intuitive capturing of the misaligned image features identified in the distance data set and in the further distance data set, for example by an operator, may be facilitated by observation of the graphic representation. The graphic representation of the misaligned image features identified in the distance data set and/or the further distance data set may include a superimposition, for example a weighted one, with the registered first image data set and/or the second image data set. The graphic representation may include a superimposition of the first distance data set, of the second distance data set and/or of the distance data set with the misaligned image features identified therein in each case.

A reliable identification of misaligned image features, for example also with consideration of acquisition parameters and/or physiological changes at the examination region of the examination object, is provided hereby.

Embodiments include a computer-implemented method for providing a trained function. In a first step, a first and a second training image data set are received. The first and the second training image data sets at least partially map a shared examination region of an examination object. In a second step, the first training image data set is registered with the second training image data set. After this a training distance data set is determined on the basis of the registered first training image data set and the second training image data set. By way of a comparison of the training distance data set with the first training image data set and/or the second training image data set, comparison misaligned image features in the training distance data set are identified, that are caused by a misalignment between the registered first and the second training image data set. Training misaligned image features are identified in the training distance data set, that are caused by a misalignment between the registered first and the second training image data sets, by applying the trained function to input data. The input data of the trained function is based on the training distance data set. At least one parameter of the trained function is adjusted on the basis of a comparison of the training misaligned image features with the comparison misaligned image features. The trained function is provided in accordance with this.

Receiving of the first and of the second training image data sets may include, for example, acquisition and/or reading out from a computer-readable data memory and/or receiving from a data memory unit, for example a database. The first and the second training image data sets may be provided by a providing unit of a medical imaging device for recording the first and the second training image data sets. The first and the second training image data sets map at least partially a shared examination region of an examination object.

The first and the second training image data set may include, for example, all properties of the first and of the second image data sets, that were described in relation to the computer-implemented method for providing misaligned image features, and vice versa. For example, the first training image data set may be a first image data set and the second training image data set may be a second image data set sein. The first and the second training image data sets may be simulated.

On registering the first training image data set with the second training image data set the first training image data set may be rigidly and/or non-rigidly transformed according to a transformation rule. The first training image data set may be registered in relation to the second training image data set according to the transformation rule. The second training image data set may be registered in relation to the first training image data set according to the transformation rule. Registering may take place in such a way that the section of the at least partially shared examination region, mapped in the first and in the second training image data sets, is optimally correlated. Registering the first training image data set with the second training image data set may also take place on the basis of metadata of the first and/or of the second training image data set.

The training distance data set may be determined on the basis of the registered first training image data set and the second training image data set. The training distance data set may include information relating to a difference and/or a distance between at least one first region-of-interest (ROI), including a plurality of image points of the registered first training image data set, and a second region-of-interest corresponding therewith, including a plurality of image points of the second training image data set. The training distance data set may also include information, for example two-dimensional and/or three-dimensional information, relating to a registering error between the at least one first region-of-interest and the second region-of-interest corresponding therewith. Determination of the training distance data set may include a difference and/or a scalar product and/or a comparison between the registered first training image data set and the second training image data set. The training distance data set may be determined in a standardized manner and/or be standardized.

The training distance data set may include all differences between the registered first training image data set and the second training image data set.

By way of a comparison of the training distance data set with the first training image data set and/or the second training image data set, the comparison misaligned image features may be identified in the training distance data set, that are caused by a misalignment between the registered first and the second training image data sets. Identifying the comparison misaligned image features in the training distance data set may include a localization and/or marking, for example an annotation, of the comparison misaligned image features in the training distance data set. The comparison of the training distance data set with the first training image data set and/or the second training image data set may be based, for example, on a comparison of image points and/or image regions. In addition, the comparison may take place by, for example manual and/or semi-automatic, annotation of a graphic representation of a, for example weighted, superimposition of the training distance data set with the first training image data set and/or the second training image data set.

For example, all artifacts of registering between the first and the second training image data sets may be identified as comparison misaligned image features in the training distance data set hereby. All differences between the registered first training image data set and the second training image data set, that are present in the training distance data set and are not caused by a misalignment, may be identified as a change at the examination region of the examination object, moreover. For example, a blood flow simulation for modeling a contrast medium spread in the examination region of the examination object may be used for this. The comparison misaligned image features in the training distance data set may include, for example, geometric image features and/or high-contrast objects, for example edges.

The training misaligned image features in the training distance data set may be identified by applying the trained function to the input data, that is based on the training distance data set.

At least one parameter of the trained function may be adjusted on the basis of the comparison between the training misaligned image features and the comparison misaligned image features.

The identification of the training misaligned image features by applying the trained function to the input data may be improved hereby in such a way that changes at the examination region of the examination object, that are not caused by a misalignment between the first training image data set and the second training image data set, are not identified as training misaligned image features.

Providing the trained function may include, for example, storage on a computer-readable storage medium and/or a transfer to a providing unit.

The method may provide a trained function, that may be used in the computer-implemented method for providing misaligned image features.

In an embodiment of the computer-implemented method for providing a trained function, the input data may also be based on the first training image data set, the second training image data set and/or the registered first training image data set.

This may provide that no anatomical and/or geometric image features, that are present in the first, the registered first and/or the second training image data set, are identified as training misaligned image features.

Embodiments include a providing unit including a computing unit and an interface. The interface may be configured for receiving a first and a second image data set. The computing unit may be configured to register the first image data set with the second image data set. In addition, the computing unit may be configured for determining a distance data set based on the registered first image data set and the second image data set. The computing unit may be configured for identifying the misaligned image features in the distance data set, with the misaligned image features being caused by a misalignment between the registered first and the second image data set. The interface may be configured for providing the identified misaligned image features.

A providing unit for providing misaligned image features is configured to carry out the above-described methods for providing misaligned image features and their aspects. The providing unit is configured to carry out the methods and their aspects in that the interface and the computing unit are configured to carry out the corresponding method steps.

The advantages of the providing unit for providing misaligned image features substantially match the advantages of the computer-implemented methods for providing misaligned image features. Features, advantages, or alternative embodiments mentioned here may likewise be transferred to the other claimed subject matters, and vice versa.

Embodiments include a medical imaging device including a providing unit for providing misaligned image features. The medical imaging device, for example the providing unit, is configured to carry out a computer-implemented method for providing misaligned image features. The medical imaging device may be configured, for example, as a medical X-ray device, for example a C-arm X-ray device, and/or computed tomography system (CT) and/or magnetic resonance system (MRT) and/or sonography system. The medical imaging device may be configured for recording and/or receiving and/or providing the first and/or the second image data set.

The medical imaging device may include, for example, a representation unit, for example a display and/or a monitor, that is configured to display information and/or graphic representations of information of the medical imaging device and/or the providing unit and/or further components. For example, the representation unit may be configured for displaying a graphic representation of the first and/or the second image data set and/or the misaligned image features.

The advantages of the medical imaging device substantially match the advantages of the computer-implemented methods for providing misaligned image features. Features, advantages, or alternative embodiments mentioned here may likewise be transferred to the other claimed subject matters, and vice versa.

Embodiments include a training unit, that is configured to carry out the above-described computer-implemented methods for providing a trained function and its aspects. The training unit includes a training interface and a training computing unit. The training unit is configured to carry out these methods and their aspects in that the training interface and the training computing unit are configured to carry out the corresponding method steps. For example, the training interface may be configured for providing the trained function.

Embodiments include a computer program product with a computer program, that may be loaded directly into a memory of a providing unit, including program segments in order to carry out all steps of the computer-implemented method for providing misaligned image features when the program segments are executed by the providing unit; and/or that may be loaded directly into a training memory of a training unit, having program segments in order to carry out all steps of the method for providing a trained function and/or one of its aspects when the program segments are executed by the training unit.

Embodiments include a computer-readable storage medium on which program segments, that may be read and executed by a providing unit, are stored in order to carry out all steps of the computer-implemented method for providing misaligned image features when the program segments are executed by the providing unit; and/or on which program segments, that may be read and executed by a training unit, are stored in order to carry out all steps of the method for providing a trained function and/or one of its aspects when the program segments are executed by the training unit.

Embodiments include a computer program or computer-readable storage medium, including a trained function provided by a computer-implemented method or one of its aspects.

An implementation largely in terms of software has the advantage that even previously used providing units and/or training units may be easily retrofitted by way of a software update. In addition to the computer program, a computer program product may optionally include additional components, such as, for example, documentation and/or additional components, as well as hardware components, such as hardware keys (dongles, etc.) in order to use the software.

BRIEF DESCRIPTION OF THE FIGURES

Embodiments are depicted in the drawings and will be described in more detail below. Identical reference numerals are used in different figures for identical features.

DETAILED DESCRIPTION

Figure 1:
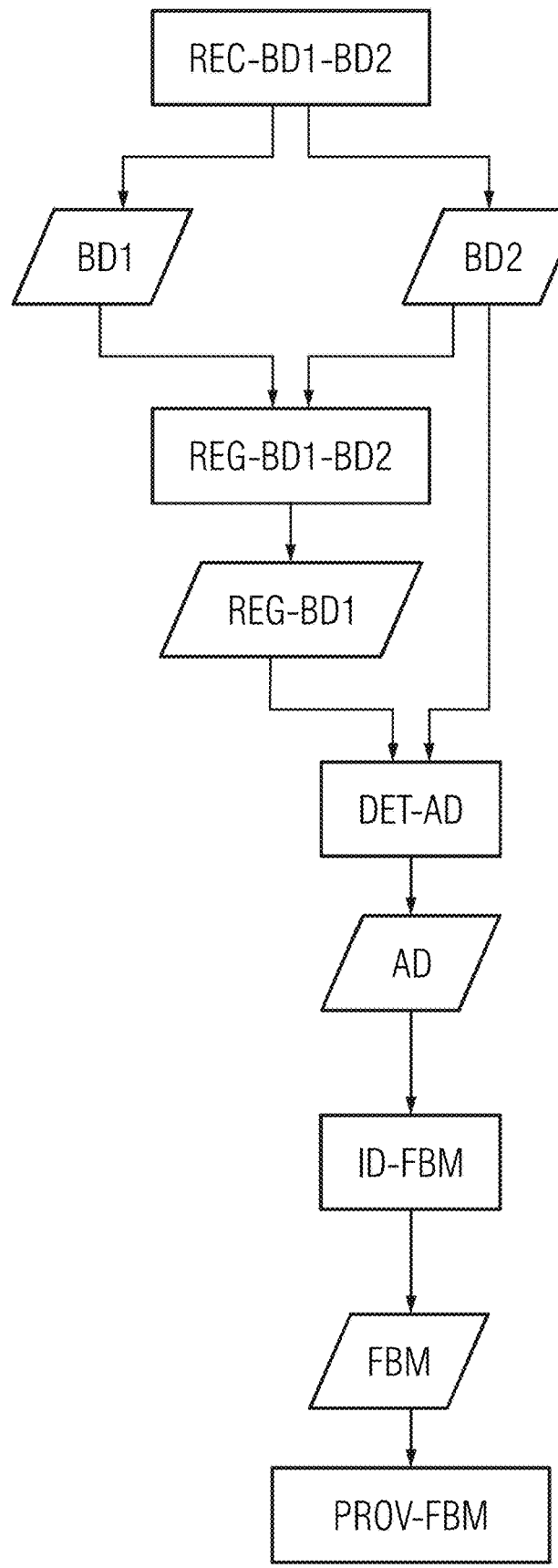
FIGS. 1, 2, 3, and 4 depict schematic representations of different embodiments of a computer-implemented method for providing misaligned image features.

FIG. 1 schematically depicts an embodiment of the computer-implemented method for providing misaligned image features. A first image data set BD1 and a second image data set BD2 may be received REC-BD1-BD2, with the first BD1 and the second image data set BD2 depicting at least partially a shared examination region of an examination object. The first image data set BD1 may be registered REG-BD1-BD2 with the second image data set. A registered first image data set REG-BD1 may be provided in accordance with this. In addition, a distance data set AD may be determined DET-AD on the basis of the registered first image data set REG-BD1 and the second image data set BD2. The misaligned image features FBM, that are caused by a misalignment between the registered first and the second image data sets may be identified ID-FBM in the distance data set AD. The identified misaligned image features FBM may be provided PROV-FBM.

The distance data set AD may include a vector field and/or a tensor field and/or distance information between the registered first REG-BD1 and the second image data set BD2.

The second image data set BD2 may be recorded before or after the first image data set BD1, for example in the course of digital subtraction angiography (DSA). The second image data set BD2 may map a change over time at the examination region of the examination object compared to the first image data set BD1.

Figure 2:
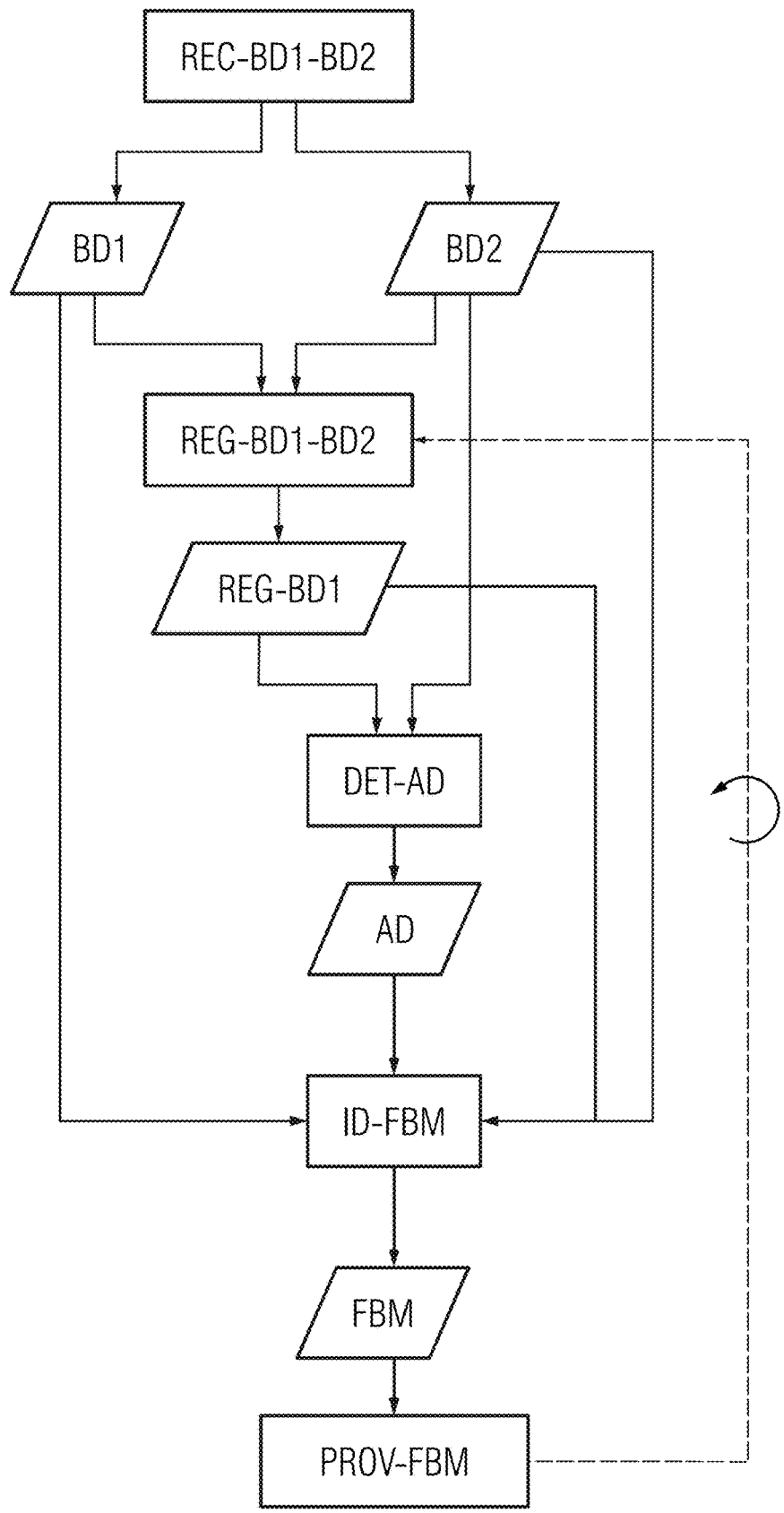

FIG. 2 schematically depicts an embodiment of the computer-implemented method for providing misaligned image features. Identification of the misaligned image features ID-FBM may also be based on the first image data set BD1, the second image data set BD2 and/or the registered first image data set REG-BD1.

According to an embodiment of the computer-implemented method for providing misaligned image features PROV-FBM, at least one parameter of registering REG-BD1-BD2 may be adjusted, for example iteratively, on the basis of the misaligned image features FBM identified. A number and/or a characteristic of misaligned image features FBM in the distance data set may be reduced by, for example iteratively, repeated execution. The result of registering may be improved hereby.

Figure 3:
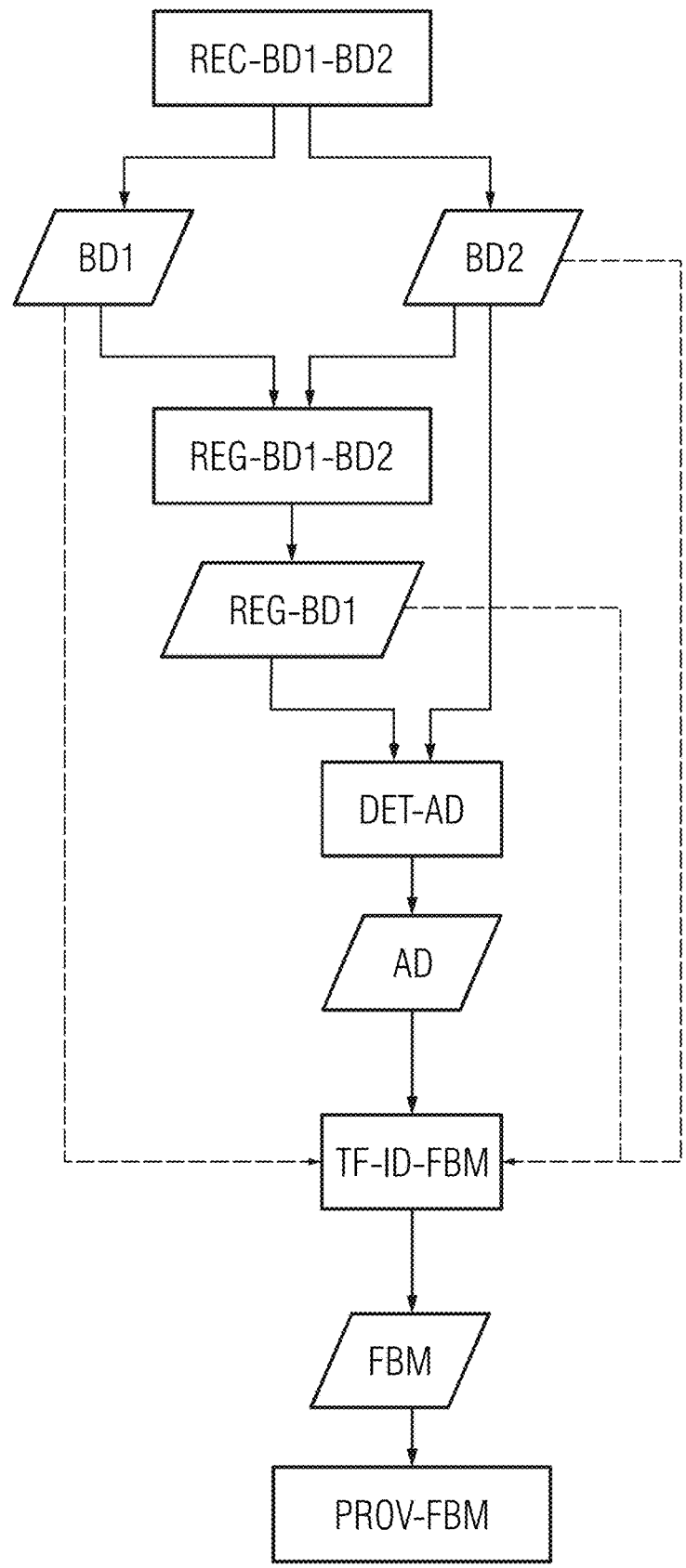

In an embodiment of the computer-implemented method for providing misaligned image features schematically depicted in FIG. 3, the misaligned image features ID-FBM may be identified by applying a trained function TF-ID-FBM to input data. The input data may be based on the distance data set AD. At least one parameter of the trained function TF-ID-FBM may be based on a comparison of training misaligned image features with comparison misaligned image features.

The input data of the trained function TF-ID-FBM may also be based on the first image data set BD1, the second image data set BD2 and/or the registered first image data set REG-BD1.

Figure 4:
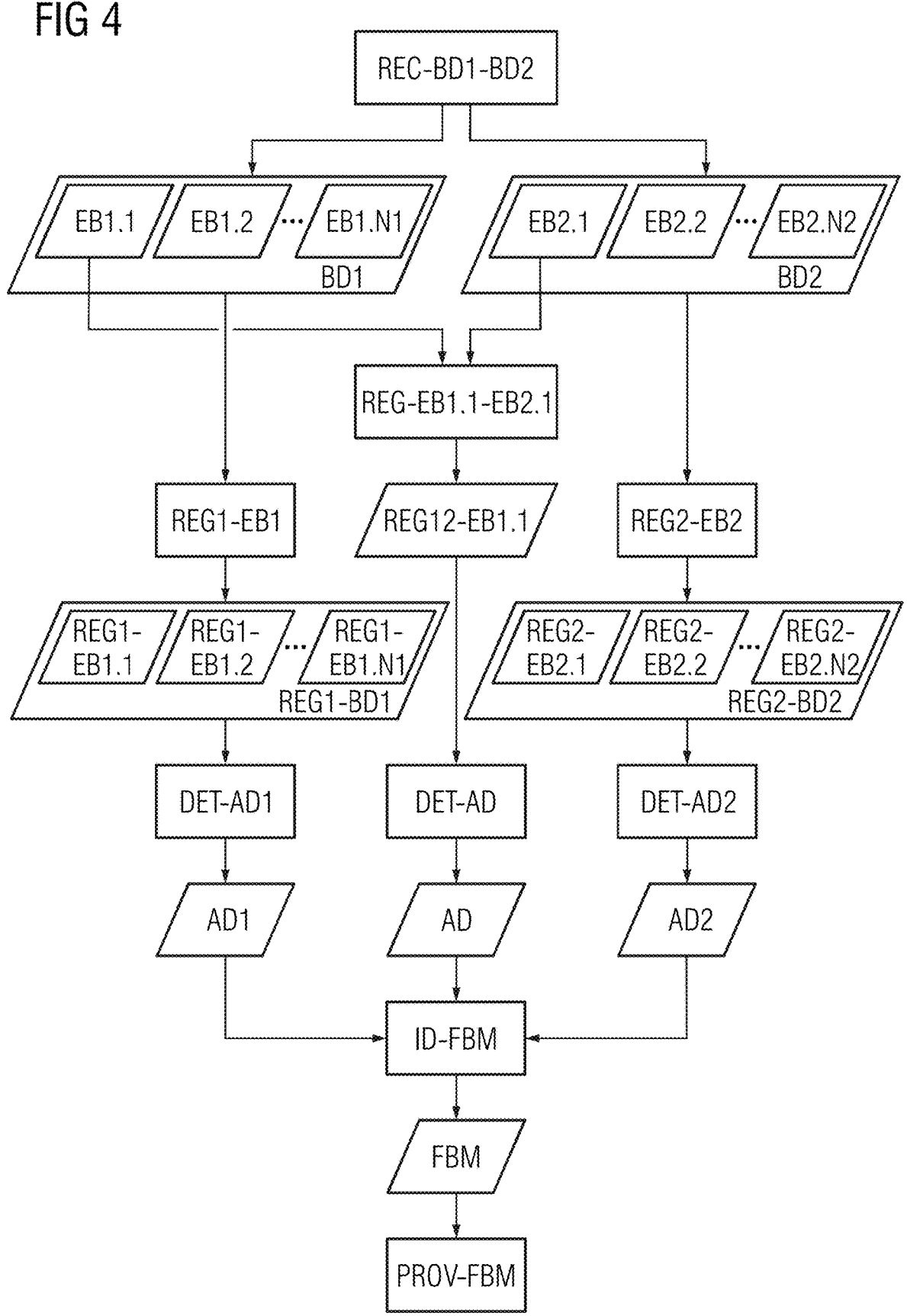

FIG. 4 schematically depicts an embodiment of the computer-implemented method for providing misaligned image features. The first image data set BD1 may include first individual images EB1.1, EB1.2 to EB1.N1 of a first phase and the second image data set BD2 may include second individual images EB2.1, EB2.2 to EB2.N2 of a second phase of an image series of the examination region of the examination object. The first and the second phases may be determined on the basis of an acquisition parameter of the image series and/or a physiological parameter of the examination object.

At least one of the first individual images EB1.1 may be registered REG-EB1.1-EB2.1 in step b) with at least one of the second individual images EB2.1. A registered first individual image REG12-EB1.1 may be provided.

Registering may include registering REG1-EB1 at least some of the first individual images EB1.1, EB1.2 to EB1.N1 with each other and registering REG2-EB2 at least some of the second individual images EB2.1, EB2.2 to EB2.N2. For example, all first individual images EB1.1, EB1.2 to EB1.N1 may be registered REG1-EB1 with each other. Analogously, all second individual images EB2.1, EB2.2 to EB2.N2 may be registered REG2-EB2 with each other. A further first image data set REG1-BD1 may be provided in accordance with this, that includes the first individual images REG-EB1.1, REG-EB1.2 to REG-EB1.N1 registered with each other. A further second image data set REG2-BD2 may be provided, that includes the second individual images REG-EB2.1, REG-EB2.2 to REG-EB2.N2 registered with each other.

In addition, the distance data set AD may be determined DET-AD on the basis of the registered at least one first individual image REG12-EB1.1 and the at least one second individual image EB2.1. Determining may also include determining DET-AD1 and DET-AD2 a further distance data set, wherein the further distance data set may include a first distance data set AD1 and a second distance data set AD2. The further distance data set, for example the first AD1 and the second distance data set AD2, may be determined DET-AD1 and DET-AD2 on the basis of the first individual images REG1-BD1 registered with each other and/or the registered second individual images REG2-BD2.

Identifying may include identifying misaligned image features ID-FBM in the further distance data set, for example the first AD1 and the second distance data set AD2, that are caused by a misalignment between the first individual images REG1-BD1 registered with each other and/or between the second individual images REG2-BD2 registered with each other.

Figure 5:
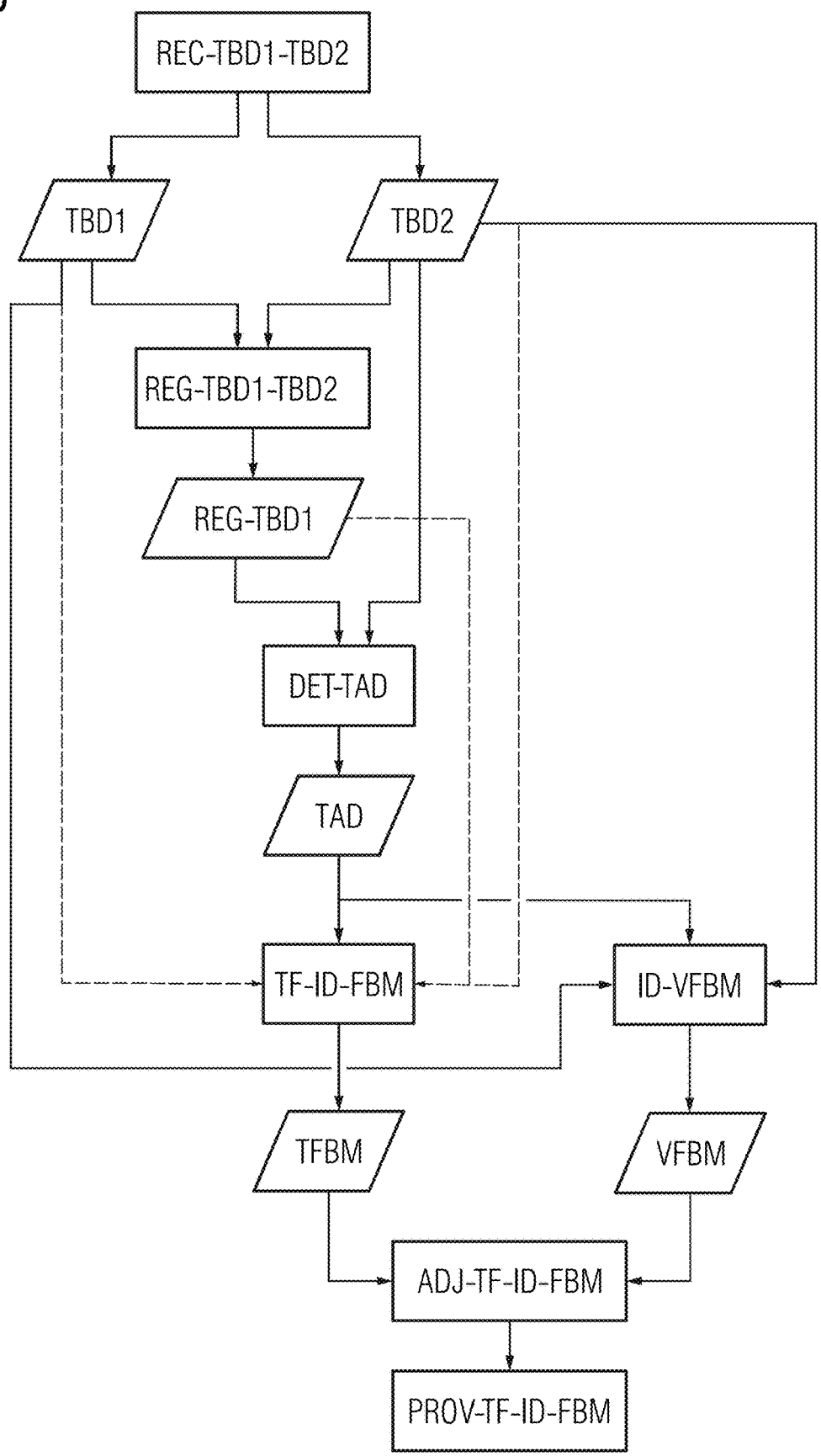
FIG. 5 depicts a schematic representation of an embodiment of the computer-implemented method for providing a trained function.

FIG. 5 schematically depicts an embodiment of the computer-implemented method for providing a trained function PROV-TF-ID-FBM. A first TBD1 and a second training image data set TBD2 may be received REC-TBD1-TBD2 in a first step. The first TBD1 and the second training image data set TBD2 may at least partially map a shared examination region of the examination object. The first training image data set TBD1 may be registered REG-TBD1-TBD2 with the second training image data set TBD2 in a second step. A registered first training image data set REG-TBD1 may be provided in accordance with this. A training distance data set TAD may be determined DET-TAD in a third step on the basis of the registered first training image data set TBD1 and the second training image data set TBD2. Comparison misaligned image features VFBM in the training distance data set TAD, that are caused by a misalignment between the registered first training image data set REG-TBD1 and the second training image data set TBD2, may be identified ID-VFBM in a fifth step. The comparison misaligned image features ID-VFBM may be identified by way of a comparison of the training distance data set TAD with the first training image data set TBD1 and/or the second training image data set TBD2. In addition, training misaligned image features TFBM in the training distance data set TAD, that are caused by a misalignment between the registered first REG-TBD1 and the second training image data set TBD2, may be identified by applying the trained function TF-ID-FBM to input data. The input data of the trained function TF-ID-FBM may be based on the training distance data set TAD.

In addition, the input data of the trained function TF-ID-FBM may also be based on the first training image data set TBD1, the second training image data set TBD2 and/or the registered first training image data set REG-TBD1.

In a further step, at least one parameter of the trained function TF-ID-FBM may be adjusted on the basis of a comparison of the training misaligned image features TFBM with the comparison misaligned image features VFBM ADJ-TF-ID-FBM. The trained function TF-ID-FBM may be provided PROV-TF-ID-FBM in accordance with this.

Figure 6:
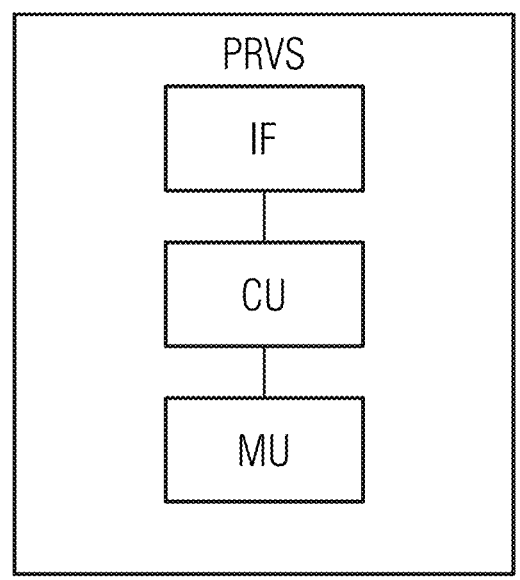
FIG. 6 depicts a schematic representation of a providing unit according to an embodiment.

FIG. 6 schematically depicts a providing unit PRVS including an interface IF, a computing unit CU, and a memory unit MU. The providing unit PRVS may be configured to carry out a computer-implemented method for providing misaligned image features PROV-FBM and its aspects in that the interface IF and the computing unit CU are configured to carry out the corresponding method steps. The interface IF may be configured, for example, for receiving the first BD1 and the second image data set BD2. The computing unit CU may be configured for registering REG-BD1-BD2 the first image data set BD1 with the second image data set BD2. In addition, the computing unit CU may be configured for determining DET-AD a distance data set AD based on the registered first image data set REG-BD1 and the second image data set BD2. The computing unit CU may be configured for identifying ID-FBM the misaligned image features FBM in the distance data set AD, that are caused by a misalignment between the registered first REG-BD1 and the second image data set BD2. The interface IF may be configured for providing PROV-FBM the identified misaligned image features FBM.

Figure 7:
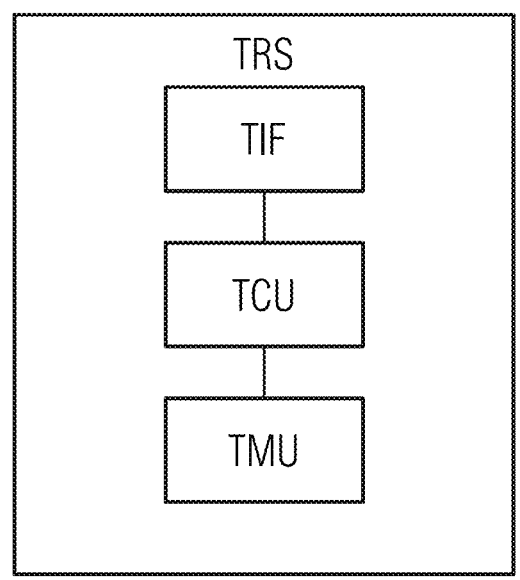
FIG. 7 depicts a schematic representation of a training unit according to an embodiment.

FIG. 7 schematically depicts a training unit TRS including a training interface TIF, a training computing unit TCU and a training memory unit TMU. The training unit TRS may be configured to carry out a computer-implemented method for providing a trained function TF-ID-FBM and its aspects in that the training interface TIF and the training computing unit TCU are configured to carry out the corresponding method steps. The training interface TIF may be configured for receiving the first TBD1 and the second training image data set TBD2. The training computing unit TCU may be configured for registering REG-TBD1-TBD2 the first training image data set TBD1 with the second training image data set TBD2. In addition, the training computing unit TCU may be configured for determining the training distance data set TAD on the basis of the registered first training image data set REG-TBD1 and the second training image data set TBD2. The training computing unit TCU may be configured for identifying ID-VFBM comparison misaligned image features VFBM in the training distance data set TAD, that are caused by a misalignment between the registered first REG-TBD1 and the second training image data set TBD2. The training computing unit TCU may be configured for identifying training misaligned image features TFBM in the training distance data set TAD by applying the trained function TF-ID-FBM to input data, that is based on the training distance data set TAD. The training computing unit TCU may be configured for adjusting ADJ-TF-ID-FBM at least one parameter of the trained function TF-ID-FBM on the basis of a comparison of the training misaligned image features TFBM with the comparison misaligned image features VFBM. The training interface TIF may be configured for providing PROV-TF-ID-FBM the trained function TF-ID-FBM.

The providing unit PRVS and/or the training unit TRS may be, for example, a computer, a microcontroller, or an integrated circuit. Alternatively, the providing unit PRVS and/or the training unit TRS may be a real or virtual network of computers (an English technical term for a real network is "Cluster", an English technical term for a virtual network is a "Cloud"). The providing unit PRVS and/or the training unit TRS may also be configured as a virtual system, that is implemented on a real computer or a real or virtual network of computers (virtualization).

An interface IF and/or a training interface TIF may be a hardware or software interface (for example PCI bus, USB or Firewire). A computing unit CU and/or a training computing unit TCU may include hardware elements or software elements, for example a microprocessor or what is known as an FPGA (acronym for "Field Programmable Gate Array"). A memory unit MU and/or a training memory unit TMU may be implemented as a Random-Access Memory (RAM for short) or as a permanent bulk memory (hard disk, USB stick, SD card, Solid State Disk).

The interface IF and/or the training interface TIF may include, for example, a plurality of sub-interfaces, that execute different steps of the respective method. In other words, the interface IF and/or the training interface TIF may also be understood as a large number of interfaces IF or a large number of training interfaces TIF. The computing unit CU and/or the training computing unit TCU may include, for example, a plurality of sub-computing units, that execute different steps of the respective method. In other words, the computing unit CU and/or the training computing unit TCU may also be understood as a large number of computing units CU or a large number of training computing units TCU.

Figure 8:
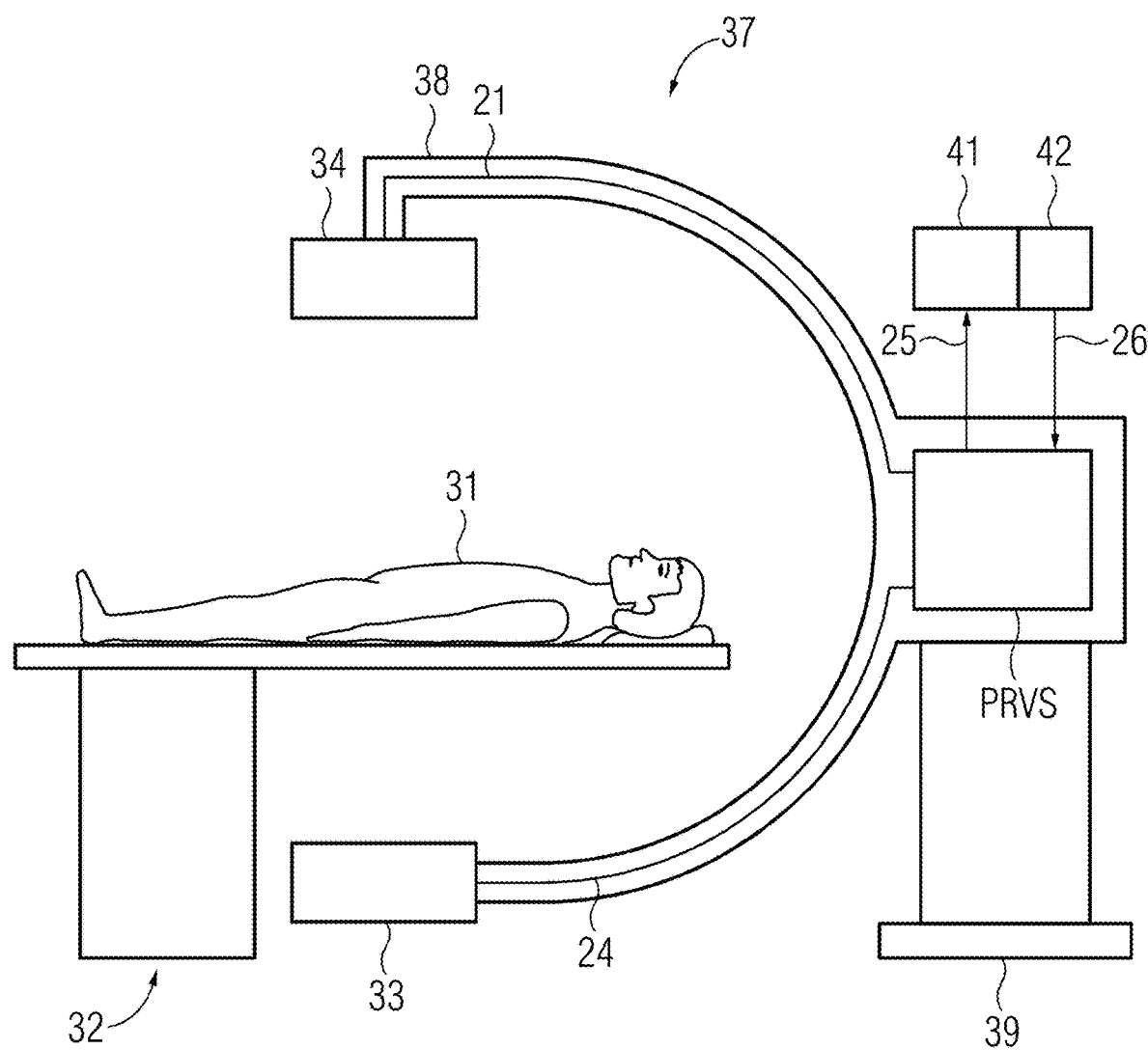
FIG. 8 depicts a schematic representation of a medical C-arm X-ray device as an example of a medical imaging device according to an embodiment.

FIG. 8 schematically depicts as an example of a medical imaging device a medical C-arm X-ray device 37. The medical C-arm X-ray device 37 may include a providing unit PRVS for providing misaligned image features PROV-FBM. The medical imaging device 37, for example the providing unit PRVS, may be configured for carrying out a computer-implemented method for providing misaligned image features PROV-FBM.

The medical C-arm X-ray device 37 includes a detector unit 34 and an X-ray source 33, moreover. For recording the first BD1 and the second image data set BD2, for example of at least one projection X-ray image respectively, the arm 38 of the C-arm X-ray device 37 may be mounted to move about one or more axes. The medical C-arm X-ray device 37 may include a movement apparatus 39, that provides a movement of the C-arm X-ray device 37 in the space.

For recording the first BD1 and the second image data set BD2 of an examination region to be mapped of an examination object 31 arranged on a patient supporting facility 32, the providing unit PRVS may send a signal 24 to the X-ray source 33. The X-ray source 33 may then emit an X-ray beam bundle, for example a cone beam and/or fan beam and/or parallel beam. When the X-ray beam bundle, following an interaction with the region of the of the examination object 31 to be mapped, strikes a surface of the detector unit 34, the detector unit 34 may send a signal 21 to the providing unit PRVS. The providing unit PRVS may receive the first BD1 and the second image data set BD2, for example with the aid of the signal 21.

The medical C-arm X-ray device 37 may include an input unit 42, for example a keyboard, and/or a representation unit 41, for example a monitor and/or display. The input unit 42 may be integrated in the representation unit 41, for example in the case of a capacitive input display. Control of the medical C-arm X-ray device 37, for example of the computer-implemented method for providing misaligned image features PROV-FBM, may be provided by an input by an operator at the input unit 42. For this, the input unit 42 may send, for example, a signal 26 to the providing unit PRVS.

The representation unit 41 may be configured to display information and/or graphic representations of information of the medical imaging device 37 and/or the providing unit PRVS and/or further components. For this, the providing unit may, for example, send a signal 25 to the representation unit 41. For example, the representation unit 41 may be configured for displaying a graphic representation of the first BD1 and/or the second image data set BD2 and/or the registered first image data set REG-BD1 and/or the misaligned image features FBM. A graphic, for example color-coded, representation of the distance data set AD and/or of the misaligned image features FBM identified therein may be displayed on the representation unit 41. The graphic representation of the misaligned image features FBM may include a superimposition, for example a weighted one, with the registered first image data set REG-BD1 and/or the second image data set BD2.

The schematic representations contained in the described figures do not indicate any scale or size ratio.

Reference is made once again to the fact that the methods described in detail above and the depicted apparatuses are merely preferred exemplary embodiments that may be modified in a wide variety of ways by a person skilled in the art without departing from the scope of the invention. Furthermore, use of the indefinite article "a" or "an" does not preclude the relevant features from also being present several times. Similarly, the terms "unit" and "element" do not preclude the relevant components from including a plurality of cooperating sub-components, that, optionally, may also be spatially distributed.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for providing misaligned image features, the method comprising:
   receiving a first image data set and a second image data set, wherein the first image data set and the second image data set map at least partially a shared examination region of an examination object;
   registering the first image data set with the second image data set;
   determining a distance data set based on the registered first image data set and the second image data set;
   identifying the misaligned image features in the distance data set that are caused by a misalignment between the registered first image data set and the second image data set by applying a trained function to input data that is based on the distance data set, wherein at least one parameter of the trained function is based on a comparison of training misaligned image features with comparison misaligned image features; and
   providing the identified misaligned image features.

2. The computer-implemented method of claim 1, wherein the identification of the misaligned image features is also based on at least one of the first image data set, the second image data set, or the registered first image data set.

3. The computer-implemented method of claim 1, wherein the input data is also based on at least one of the first image data set, the second image data set, or the registered first image data set.

4. The computer-implemented method of claim 1, wherein the distance data set comprises at least one of a vector field, a tensor field, or distance information between the registered first image data set and the second image data set.

5. The computer-implemented method of claim 1, wherein the second image data set is recorded after the first image data set, wherein the second image data set maps a change over time at the examination region of the examination object compared to the first image data set.

6. The computer-implemented method of claim 1, wherein the first image data set comprises first individual images of a first phase and the second image data set comprises second individual images of a second phase of an image series of the examination region of the examination object; wherein the first and the second phases are determined using an acquisition parameter of the image series or a physiological parameter of the examination object.

7. The computer-implemented method of claim 6, wherein for registering at least one of the first individual images is registered with at least one of the second individual images, wherein registering further comprises registering at least some of the first individual images with each other or registering at least some of the second individual images with each other;
   wherein the distance data set is determined on a basis of the registered at least one first individual image and the at least one second individual image;
   wherein determining further comprises determining a further distance data set based on the registered at least one first individual image, the registered at least one second individual image, or the registered at least one first individual image and the registered at least one second individual image;
   wherein identifying further comprises identifying misaligned image features in the further distance data set that are caused by a misalignment between the registered first individual images, between the registered second individual images, or between the registered first individual images and between the registered second individual images.

8. A computer-implemented method for providing a trained function, the method comprising:
   receiving a first training image data set and a second training image data set, wherein the first training image data set and the second training image data set map include at least partially a shared examination region of an examination object;
   registering the first training image data set with the second training image data set;
   determining a training distance data set based on the registered first training image data set and the second training image data set;
   identifying comparison misaligned image features in the training distance data set that are caused by a misalignment between the registered first training image data set and the second training image data set by a comparison of the training distance data set with the first training image data set, the second training image data set, or the first training image data set and the second training image data set;
   identifying training misaligned image features in the training distance data set that are caused by a misalignment between the registered first training image data set and the second training image data set by applying the trained function to input data, wherein the input data is based on the training distance data set;
   adjusting at least one parameter of the trained function based on a comparison of the training misaligned image features with the comparison misaligned image features; and
   providing the trained function.

9. The computer-implemented method of claim 8, wherein the input data is also based on at least one of the first training image data set, the second training image data set, or the registered first training image data set.

10. A medical imaging system comprising:
    a medical imaging device configured to record and provide a first image data set and a second image data set to a providing unit; and the providing unit configured to:
register the first image data set with the second image data set;
determine a distance data set based on the registered first image data set and the second image data set;
apply a trained function to input data that is based on the distance data set, wherein the trained function is configured to identify the misaligned image features that are caused by a misalignment between the registered first training image data set and the second training image data set, wherein at least one parameter of the trained function is based on a comparison of training misaligned image features with comparison misaligned image features; and
provide the identified misaligned image features.

11. The medical imaging system of claim 10, wherein the identification of the misaligned image features is also based on at least one of the first image data set, the second image data set, or the registered first image data set.

12. The medical imaging system of claim 10, wherein the input data is also based on at least one of the first image data set, the second image data set, or the registered first image data set.

13. The medical imaging system of claim 10, wherein the distance data set comprises at least one of a vector field, a tensor field, or distance information between the registered first and the second image data set.

14. The medical imaging system of claim 10, wherein the second image data set is recorded after the first image data set, wherein the second image data set maps a change over time at an examination region of an examination object compared to the first image data set.

15. The medical imaging system of claim 10, wherein the first image data set comprises first individual images of a first phase and the second image data set comprises second individual images of a second phase of an image series of the examination region of the examination object; wherein the first and the second phases are determined using an acquisition parameter of the image series or a physiological parameter of the examination object.

16. The medical imaging system of claim 15, wherein the providing unit is configured to register at least one of the first individual images with at least one of the second individual images, wherein registering further comprises registering at least some of the first individual images with each other or registering at least some of the second individual images with each other;
wherein the distance data set is determined on a basis of the registered images;
wherein determining further comprises determining a further distance data set based on the registered images;
wherein identifying further comprises identifying misaligned image features in the further distance data set that are caused by a misalignment between the registered images.

* * * * *